United States Patent [19]

Rasmussen

[11] 3,858,332

[45] Jan. 7, 1975

[54] METHOD AND APPARATUS FOR DEMONSTRATING POLYNOMIAL ALGEBRAIC OPERATIONS

[76] Inventor: Peter Rasmussen, 2406 McKinley, Berkeley, Calif. 94703

[22] Filed: Aug. 27, 1973

[21] Appl. No.: 391,650

[52] U.S. Cl. .............................. 35/30, 35/34, 35/72
[51] Int. Cl. .......................................... G09b 23/02
[58] Field of Search ....... 35/30, 34, 1, 70, 72, 35 R, 35/31 R, 31 F, 31 G, 31 D

[56] References Cited
UNITED STATES PATENTS

| 205,960 | 7/1878 | Hill | 35/72 |
| 3,190,013 | 6/1965 | Cuttat | 35/35 R |
| 3,204,343 | 9/1965 | Pollock | 35/31 G |
| 3,208,162 | 9/1965 | Wisdom | 35/30 |
| 3,229,388 | 1/1966 | Smith | 35/70 |

FOREIGN PATENTS OR APPLICATIONS

| 1,031,507 | 3/1953 | France | 35/34 |
| 25,259 | 7/1952 | Finland | 35/35 R |
| 919,025 | 2/1963 | Great Britain | |

Primary Examiner—Wm. H. Grieb
Attorney, Agent, or Firm—Warren, Rubin & Chickering

[57] ABSTRACT

An assembly for the demonstration of algebraic or arithmetic operations by the manipulation of a plurality of rectangular elements of different sizes and shapes and characterized by the incommensurability of selected width and length dimensions thereof, and the distinguishability of opposing faces of the elements to denote positively and negatively oriented elements.

9 Claims, 9 Drawing Figures

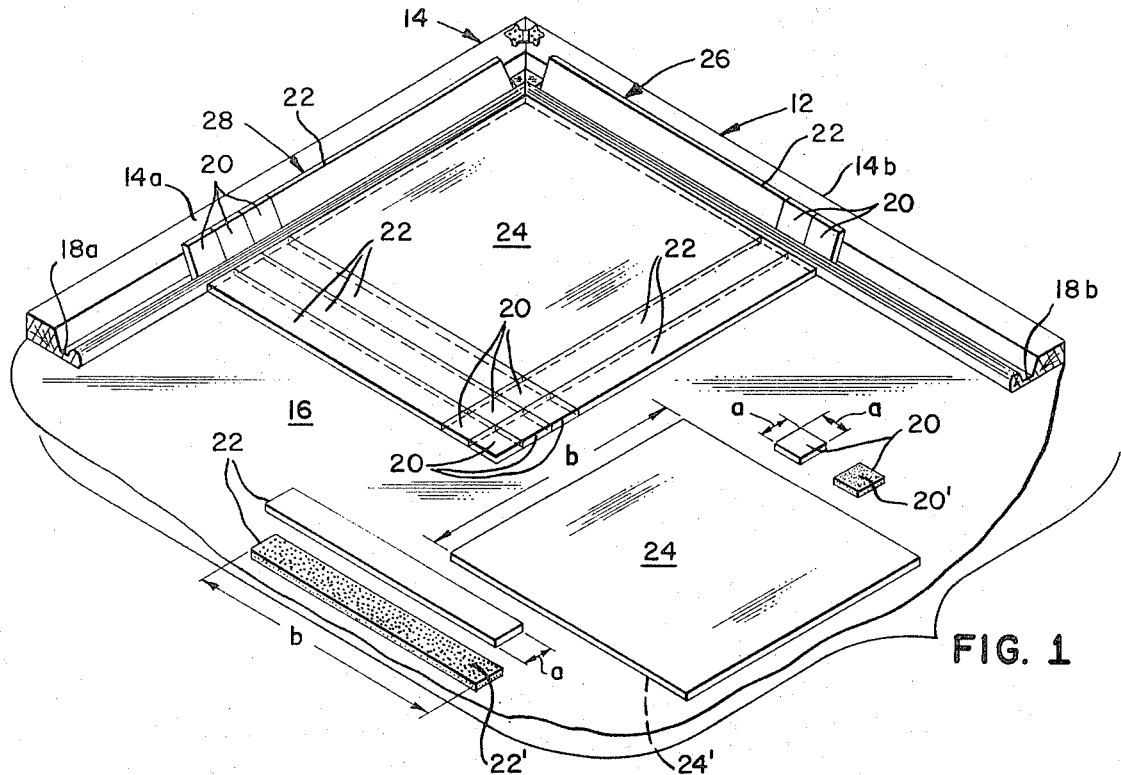
FIG. 1
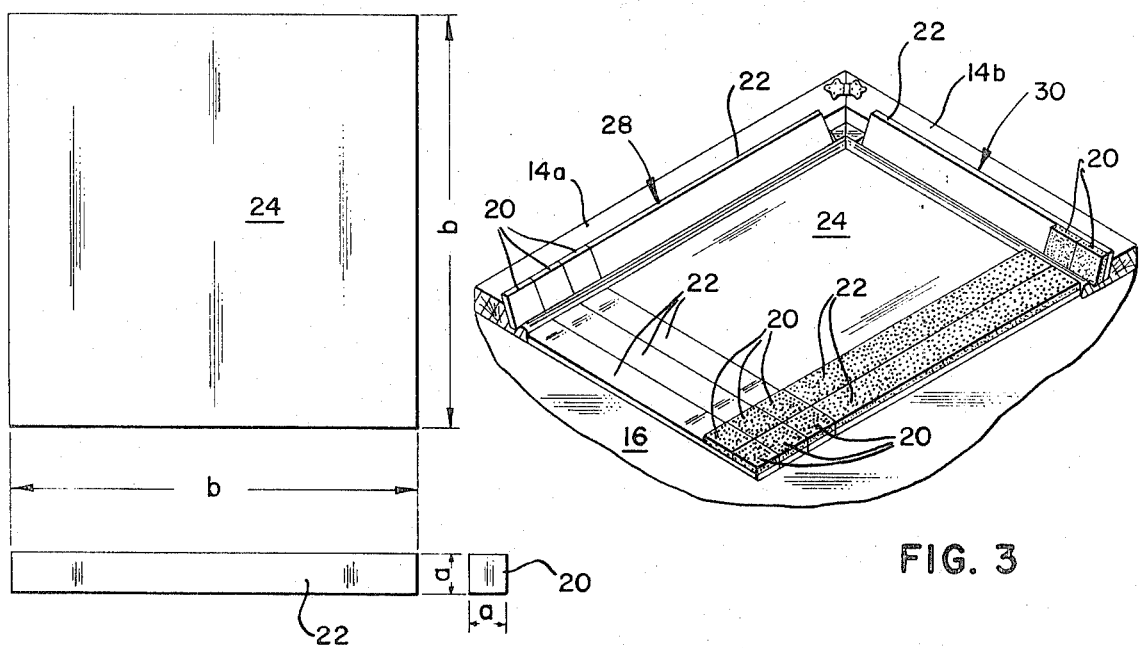
FIG. 2
FIG. 3

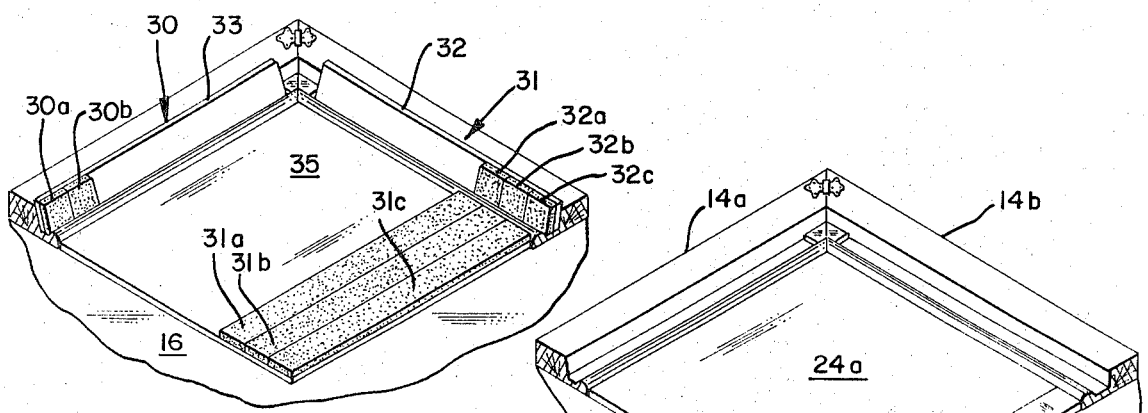
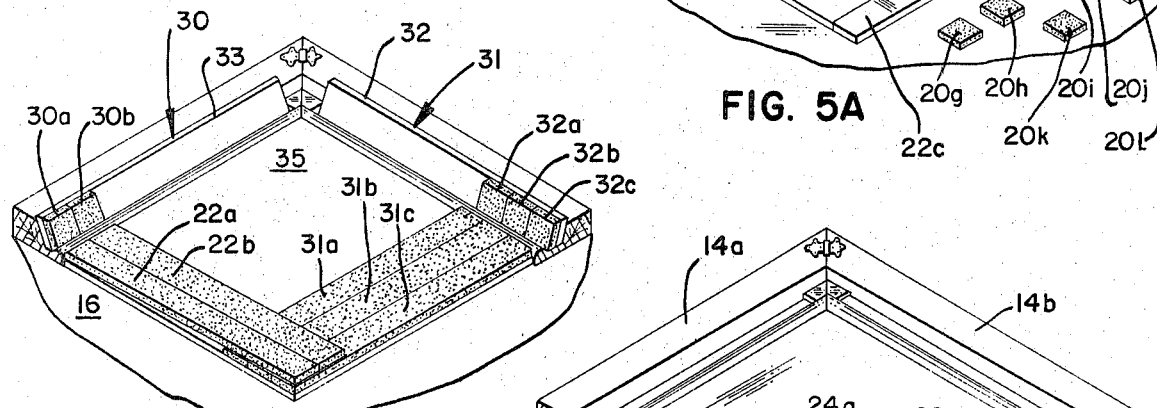
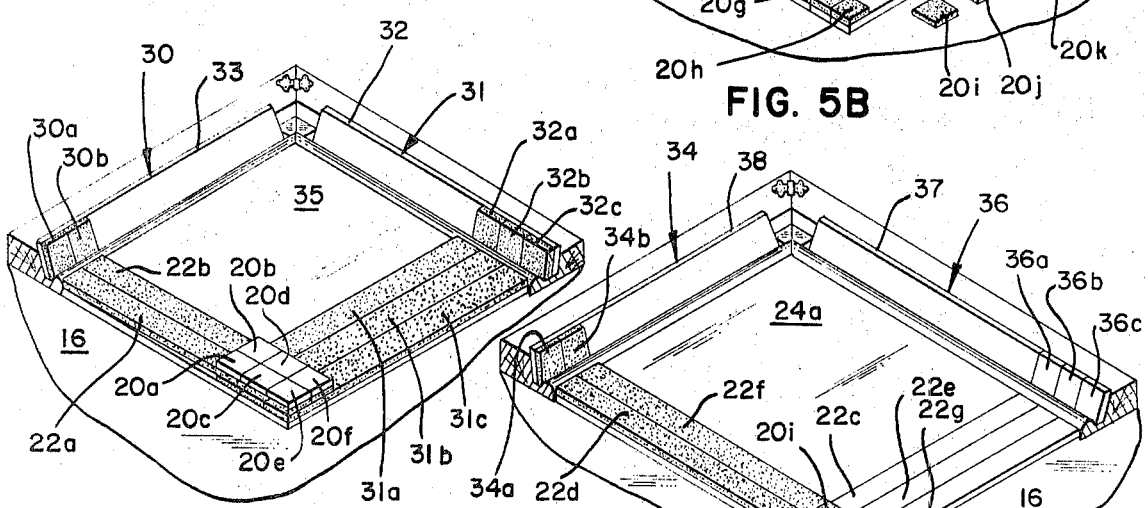

METHOD AND APPARATUS FOR DEMONSTRATING POLYNOMIAL ALGEBRAIC OPERATIONS

This invention relates to teaching aids, and particularly a tactile and visual assembly which may be used to demonstrate polynomial algebraic operations.

In recent years a number of visual and tactile demonstration type teaching kits have been introduced to assist in the teaching of arithmetic and algebra. Examples with which I am familiar are disclosed in the U.S. Pat. No. 3,204,343 to A. F. S. Pollock for APPARATUS FOR TEACHING OR STUDYING MATHEMATICS, patented Sept. 7, 1965; British Pat. No. 919,025 to Z. P. Dienes for IMPROVEMENTS IN TEACHING APPARATUS published Feb. 20, 1963; and U.S. Pat. No. 3,229,388 to F. M. Smith for EDUCATIONAL DEVICE patented Jan. 18, 1966. In addition, Dienes has authored material, including task cards to accompany demonstration materials collectively identified as the DIENES ALGEBRAIC EXPERIENCE MATERIALS, published by the Educational Supply Association Ltd., The Pinnacles, Harlow, Essex, England; and a brochure entitled The Arithmetic and Algebra of Natural Number, a manual for use with the Experience materials, by the same publisher, 1965. The publications provide and explain algebra demonstrations of even greater scope than that disclosed in the aforementioned British patent.

None of the foregoing teaching aids, however, including Dienes's authored materials, provide the user with a physical array of elements or tiles which, when properly manipulated, compel a single correct solution to a linear binominal expansion; nor do such prior art devices, or any others with which I am familiar, treat binomial expansions with negative terms effectively, that is so some physical aspect related to the negative value of the term operates in the manipulative problem solving procedure.

Thus it is an object of the present invention to provide an assembly for the demonstration of polynomial algebraic operations, primarily the multiplication of linear binomials by each other and the factoring of second power polynomials, which utilizes an assortment of tiles or elements, each of which may represent all or part of a term of a binomial, or a portion of the product of two binomials.

It is a further object of my invention to provide an array of tiles or elements to achieve the foregoing described objective and which may only demonstrate the binomial expansion desired, and no other.

A feature and advantage of my invention is that due to its unique problem solving characteristic, students may themselves manipulate the elements and obtain solutions which are bound to represent the correct result and are readily demonstrable.

Other objects, features, and advantages of my invention shall be evident to one of ordinary skill in the art of such devices upon a reading of the specification which follows herein and with reference to the accompanying drawings wherein FIG. 1 is a perspective view of a teaching assembly embodying my invention and which demonstrates multiplication of the linear binomials $b + 2a$ and $b + 3a$ to produce the second power polynomial product, $b^2 + 5ab + 6a^2$;

FIG. 2 is a plan view of each of three different types of elements or tiles utilized in the practice of my invention;

FIG. 3 is a perspective view similar to that of FIG. 1 only illustrative of the multiplication of binomials containing negative and positive terms, particularly $b - 2a$ and $b + 3a$, to produce the product, $b^2 + ab - 6a^2$;

FIGS. 4A through 4C, inclusive, is a sequence of three perspective views showing an assembly embracing my invention utilized to demonstrate multiplication of linear binomials including negative terms in each, namely $b - 3a$ and $b - 2a$ to produce the product $b^2 - 5ab + 6a^2$; and FIGS. 5A through 5C, inclusive, as a sequence of three perspective views showing an assembly embracing my invention utilized to demonstrate factoring of the second power polynomial, $b^2 + ab - 6a^2$, to its constituent linear binomials, $b + 3a$ and $b - 2a$.

In a preferred embodiment of my invention I provide physical embodiments of linear binomials, one at right angles to the other, so that the rectangle defined thereby is the physical representation of the multiplication of the two binomials to produce a second degree polynomial; conversely, utilizing the special tiles or elements of my device as representing terms of a second degree polynomial, arrangement of the tiles representing these terms to form a rectangle, in accordance with the features of my invention to be explained in greater detail below, will reveal to the user the constituent linear binomial factors of that polynomial. It is the essence of my invention that the physical relationship between the tiles or elements which I have devised is such that while they may be arranged in more than one way in arriving at a solution to a simple linear binomial multiplication, or factoring of a second degree polynomial, only correct solutions may be devised; and my invention embraces structure for denoting negative as well as positive terms of a linear binomial, or second degree polynomial, in a physical manner and so that the elements or tiles, if positively or negatively oriented, contribute to the correct solution of the problem.

An understanding of my invention may be best approached by referring first to FIG. 1 where I generally show an assembly 12 comprising a frame at 14 resting on a flat working surface 16 and having arms 14a and 14b at right angles to each other and joined by a hinge so that said arms may be foldably joined together. Arms 14a, 14b are fabricated to have respectively, grooves 18a and 18b shaped to conveniently hold and carry at least one and preferably two thicknesses of assorted tiles or elements 20 and 22 which I prefer to fabricate of relatively thin and commonly available stock, such as wood, plastic, fibreboard, cardboard, or the like. A third type of tile, tile 24, is also shown and with its brethren 20, 22 will next be explained in connection with the use of my invention to demonstrate the multiplication of two linear binomials to produce a second power polynomial product.

Tiles 20, 22 and 24 referred to above are fabricated, respectively, to represent physically each of the algebraic symbols, $a^2$, $ab$ and $b^2$. That is each of tiles 20 is shaped in the form of a square whose edge length is "$a$", so the area of the tile face is $a^2$; tiles 22 in the form of a rectangle having width "$a$" and length "$b$" so its area is $ab$; and tile 24 in the shape of a square having edge $b$, so the area of a tile 24 face is $b^2$—see also FIG. 2. It is to be appreciated, of course, that the terms $a$ and $b$ are purely arbitrary in the true algebraic sense, and may be understood to represent other letters, such as $x$, $y$, etc., numbers such as 1, 2, 3, etc., or any combination thereof, i.e., $a$ may stand for $x$, $y$, $mx$ or $ny$, while the letter $b$ could stand for a number 1, 2, or 3, etc., or another letter.

Thus, a tile or element serves to physically demonstrate one of two different kinds of algebraic terms: (1) the length, or width, of the tile itself represents a linear value, so that when aligned with other tiles each length therealong represents the linear value a or b, or its numeric equivalent; and (2) when placed flat, face up, on a working surface each of the aforementioned tiles represents an area, such as the term $a^2$ (tile 20), or $ab$ (tile 22), or $b^2$ (tile 24). Moreover, a critical aspect of my invention, as shall become apparent hereinafter, is that the two lengths a and b are incommensurable, i.e., the physical length of $b$, or any multiple of $b$, is not evenly divisible by $a$.

In view of the foregoing it may now be appreciated that a binomial term, for example $b + 2a$, may be physically represented by placing a tile 22 immediately contiguous to two tiles 20, shown in FIG. 1 as the array at 26. Similarly, the binomial $b + 3a$ may be represented by a single tile 22 along with three tiles 20 as shown along leg 14a and designated array 28.

The rectangular area on working surface 16 defined by the binomial arrays 26 and 28 is the product or polynomial expansion thereof, in accordance with further and more specific directions set forth below. Such expansion may be physically represented on working surface 16 by covering that area with whatever selection of tiles one requires to just exactly fill that area. Note that in the example shown such selection consists of one tile 24 ($b^2$), five tiles 22 ($5ab$), and six tiles 20 ($6a^2$), or in conventional algebraic terms the area is equivalent to the polynomial $b^2 + 5ab + 6a^2$. One very important and beneficial aspect of my invention is that the physical solution shown at FIG. 1 to the operation, $(b + 2a) \times (b + 3a)$, is uniquely limited, insofar as the number and type of tiles displayed. This follows in accordance with my invention because of the incommensurability of the lengths of the $a$ and $b$ tiles as set forth hereinabove.

More particularly, the space occupied by tile 24, for example, cannot be an edge-to-edge collection of either tiles 20 or 22 because such a collection would not exactly occupy the region covered by tile 24. That is, a plurality of tiles 20 or 22 would either fall short of filling the same area as tile 24, or over-occupy such area, because of the aforementioned incommensurability of the lengths of the tiles. Thus only a single tile 24 ($b^2$) may be used to represent that portion of the binomial expansion derived from the terms b. Similarly ab cannot be represented by a collection of tiles 20. The remainder of the solution to the binomial expansion, using various of my tiles or elements, is also arrived at by the trial-and-error technique, placing various tiles down on working surface 16 so as to completely fill the remaining area thereon bounded by the rectangular outline defined by the two binomial arrays at 26 and 28. In the example shown this can only be achieved by laying down five tiles 22, although the particular arrangement thereof may vary, each representing the various terms ab; and thereafter filling in unoccupied space with six tiles 20, each representing the term $a^2$. Again, because the edge dimension corresponding to the term $b$ and the edge dimension corresponding to the term $a$ are incommensurable, the only combination of tiles that the user can position to achieve the solution thereto is exemplified by the one shown in FIG. 1, i.e., $5ab + 6a^2$, or any equivalent arrangement of such tiles. Thus the entire correct solution to the multiplication of the binomials $b + 2a$ and $b + 3a$ is that demonstrated on working surface 16 in FIG. 1, namely $b^2 + 5ab + 6a^2$.

Referring to the foregoing, I prefer to make the various tiles in primary colors, i.e., none having elements of the other, to reflect the notion of incommensurability. That is, tiles 20 may be yellow; tiles 22 red; and tiles 24 blue. Other combinations may be used.

At FIG. 3 I illustrate the use of my invention to multiply binomials, either one or both of which may contain negative terms. To understand this salutary feature of my invention, certain aspects thereof mentioned briefly at the opening paragraphs above are now further explained and still others added. In accordance with my invention, linear binomial expressions are physically demonstrated and set up so as to define the sides of a rectangle whose area can thereafter be physically demonstrated using only the tile equivalents of the correct terms of that particular binomial multiplication.

In the case of a binomial such as $b - 2a$, represented at FIG. 3 by the array 30, negative terms must be distinquishable from positive ones, and related thereto physically so that the so-called net value represented by the combination of tiles is in length physically equivalent to the value of the binomial. In accordance with my invention, I distinguish between positive and negative terms by having one face of tiles such as tile 20, 22, or 24 with one kind of surface to denote positive value; and the opposite faces 20', 22', 24' with a different kind of appearance to denote a negative term—see FIG. 1 also where the plain surfaces designate positive values and the textured surfaces negative values.

Further, in accordance with my invention, a region of a working surface whose area represents a term of a second degree polynomial, or whose length represents the value of linear binomial, is considered to be positively oriented if it is completely covered by one more layer of positively oriented tiles thereon than layers of negatively oriented tiles; is considered to be negatively oriented if completely covered by one more layer of negatively oriented tiles than layers of positively oriented tiles; and is neutral if the number of layers of positively oriented tiles equals the number of layers of negatively oriented tiles.

Returning now to the array $b - 2a$ at FIG. 3 it may now be appreciated that the value of that binomial is represented by the net length of the display along arm 14b of positively oriented tile 22 and the two tiles 20 placed with their textured surfaces showing and arranged to subtract or diminish the b term, tile 22, in accordance with the above explained aspect of my invention. That is, the net length of array 30 is "positively oriented" because most of the array is "completely covered by one more layer of positively oriented tiles thereon than layers of negatively oriented tiles"; and the remainder of the array is neutral, or of null value, because the rest comprises positively oriented tile 22 overlayed with two negatively oriented tiles 20, so that for the remainder of the array the "number of layers of positively oriented tiles equals the number of negatively oriented tiles."

Now the user may proceed to physically represent on working surface 16 the rectangle represented by the linear arrays 28 and 30, which in turn will represent the value of the multiplication of the two binomials, $b - 2a$ by $b + 3a$. This is done again following the same principles described in respect to FIG. 1, and the above aspect of the present surfaces; and also by observing that to find the product of the binomials represented along arms 14a and 14b, in accordance with my invention, tiles must be placed on working surface 16 in such a manner that the rectangle defined by the tiles along the legs of the frame, which represent the binomials to be multiplied, have the orientation (positive or negative) determined as follows: the orientation of the rectangle must be positive if the orientations of the binomials displayed along the legs are the same; and negative if different. Furthermore, the net value of all sections of all regions of the working surface outside of the aforementioned rectangle must be neutral, or empty, i.e., represented by either the presence of no tiles at all, or tiles whose net value considering their layered arrangement is zero.

Once the rectangle is completed in accordance with the foregoing aspects of my invention, the polynomial expansion or product of $b - 2a$ and $b + 3a$ may be discerned on working surface 16, namely $b^2 + 3ab - 2ab - 6a^2$, accounting for all the tiles present, or, in proper simplified form, $b^2 - ab - 6a^2$.

At this point it should be apparent that the physical length of $b$ must be greater than the physical length of the corresponding negative term or terms $na$, where $n$ is an integer. Of course, to illustrate binomials having negative terms with higher integer coefficients, it is necessary only to devise tiles wherein the physical relationship between the lengths $a$ and $b$ of the tiles is such that $b$ is much greater than $a$, or arrange to use more than one tile 22 to represent the term $b$.

It should be noted that certain tiles may be of one color and considered positive, and those of another negative. Then such tiles may be selected as necessary to reflect positive or negative terms instead of using different faces of the same tiles.

In FIGS. 4A through 4C, inclusive, I illustrate a further application of my invention to the multiplication of binomials both having negative terms as explained above. More particularly, I once again show the binomial array 30, $b - 2a$, and array 31, $b - 3a$.

Here again, each of the arrays 30 and 31 physically represent the sides of a rectangle whose lengths are, respectively $b - 2a$ and $b - 3a$, this being achieved by not only placing the $a$ tiles 30a, b and 32a, b, c with their negative value sides toward the working area, but also by placing them on top of the $b$ tiles 32, and 33, respectively, so that each array remains with a positive net value less than $b$, i.e., $b - 2a$ and $b - 3a$. It now remains for the user to construct a rectangle on working surface 16 in accordance with the rules set out hereinabove, namely a rectangle whose region on the working surface is positively oriented, because the net value of both physical sides, $b - 2a$ and $b - 3a$, is positive, and whose side dimensions correspond to $b - 2a$ and $b - 3a$.

The first step in such a solution is to place $b^2$ tile 35 down, face up, thus denoting a positively oriented surface corresponding to the product of the two positive sides, $b - 2a$ and $b - 3a$, of the rectangle. However, the area of $b^2$ is too great to designate the correct solution, since both binomials, $b - 2a$ and $b - 3a$, are less than $b$, both in algebraic terms and the positive physical lengths they represent.

Thus it is necessary to "cut down" the size or region of $b^2$ tile 35 in its occupation of working surface 16 so that its edges in effect correspond physically to $b - 2a$ and $b - 3a$. This is done first by simply placing tiles 31a, b, and c, down on tile 35 thus reducing the region of tile 35 thereunder to a neutral value (FIG. 4A).

The same is then done next in relation to the side represented by array 30, $b - 2a$, by the use of tiles 22a and 22b, but when this is done, the ends of 22a and b overlap the ends of 31a, b, and c, so that the region thereunder is negatively oriented. This, however, does not correspond to represent any portion of the rectangle represented by the sides $b - 2a$ and $b - 3a$; so the negatively oriented region must be made neutral. This is done by adding six $a^2$ positively oriented tiles 20a, b, c, d, e and f to the overlapping portions of tiles 31a, b, and c and 22a and b. Then the solution to the binomial expansion $b - 2a$ and $b - 3a$ is complete, and the solution is physically represented on the working surface as $b^2$ (tile 35) $- 5ab$ (tiles 22a, b and 31a, b and c) $+ 6a^2$ (tiles 20a, b, c, d, e and f.

A still further and important application of my invention is in the physical demonstration of factoring a second degree polynomial into its constituent linear binomial factors. I illustrate this in FIGS. 5A through 5C, inclusive. At FIG. 5A I show the negatively oriented tiles 20g through 20l, inclusive, which represent $-6a^2$; tile 22c, representing $ab$; and tile 24a, corresponding to $b^2$. The entire polynomial to be factored is thus represented as $b^2 + ab - 6a^2$.

The procedure to physically represent and determine the linear binomial factors of this polynomial display requires that a rectangular array be constructed equal in area to the area of the positively oriented tiles less the area of the negatively oriented tiles described above. This is done by the user employing trail-and-error, but still observing the rules explained hereinabove with respect to positively, negatively, and neutral oriented surfaces; and that a rectangle on the working surface represents the product of binomials displayed along the arms 14a and b of the frame.

A typical progression to each solution is shown at FIGS. 5A through 5C.

First, major tile 24a is placed as shown along with tile 22c to form a rectangle.

Then, each of tiles 20g, h, etc., are attempted to be placed thereon to produce a rectangle. This cannot be done, recalling the incommensurability of $a$ and $b$, by merely laying each of the negatively oriented tiles 20g, h, etc., on top of tile 22c, for example. Instead the user is compelled simply to place one of the tiles 20, specifically tile 20g, on the end of 22c; but to maintain a rectangular form, an additional negatively oriented tile 22d must be placed immediately adjacent thereto (FIG. 5B). HOwever, to retain equality of the original polynomial displayed and to be factored, the user must now add a new positively oriented tile of equal value, tile 22e.

The last step above enables the user to add still another of the negatively oriented tiles 20, i.e., tile 20h, to the arrangement, and maintain a rectangular orientation.

The aforedescribed approach is repeated until all of the tiles originally present on working surface 16 to represent the polynomial to be factored are occupied in a rectangular representation. This is shown at FIG. 5C, and the representation along each of two edges thereof correspond to the binomial factors $b + 3a$ and $b - 2a$ of the original polynomial $b^2 + ab - 6a^2$.

It is interesting to note, of course, that the multiplication problem explained hereinabove in respect of FIGS. 4A through 4C, inclusive, has a corresponding factoring problem. The polynomial product $b^2 - 5ab + 6a^2$ can be displayed in the form of a single positive tile 24, five negative $ab$ tiles 22$a$, $b$, etc., and six positive $a^2$ tiles 20$a$, $b$, etc. This polynomial can then be factored by following a process similar to that described above in respect of FIGS. 5A through 5C, inclusive. The user would eventually produce the results commenced with in FIG. 4A, namely the linear binomial factors $b - 2a$ and $b - 3a$.

As indicated earlier, the solution to the foregoing factoring problems is also uniquely achieved in accordance with my invention for primarily the same reason as set forth hereinabove in explaining the basic reason that the multiplication solutions are unique: i.e., $a$ and $b$ are incommensurable; and negative value terms may be physically demonstrated by denoting one side of the tiles as positive, the other negative, and by generally following the rules in accordance with my invention for displaying linear binomials and second degree polynomial expressions.

I claim:

1. In an assembly for the demonstration of algebraic or arithmetic operations by the manipulation of a plurality of rectangular elements on a working surface, the improvement comprising:

first ones of said elements shaped to define squares each having the same edge dimension;

second ones of said elements shaped to define rectangles each having a width dimension equal to the edge dimension of said first elements and a length dimension greater than said width dimension;

third ones of said elements shaped to define squares each having the same edge dimension, last said edge dimension equal to the length dimension of said second elements and incommensurable with respect to the edge dimension of said first elements and the width dimention of said second elements;

a frame;

a first arm of said frame and a second arm of said frame;

connecting means secured to one of each of said arms to join the latter in end-to-end relationship and at right angles to each other; and support means formed in each of said arms to removably carry a plurality of said elements.

2. In an assembly as defined in claim 1 and wherein further said connecting means includes means to cause said arms to be foldably joined together, so that said frame may be disposed in an open position with said arms at right angles to each other and alternatively in a closed position with the arms folded together to form a compact and portable unit.

3. The assembly of claim 1 wherein
a first face is formed on each of said elements;
a second face is formed on each of said elements opposite said first face; and
means are associated with each of said faces to cause said first face to be physically distinguishable from said second face and to denote one of said faces as positively oriented and the opposite of said faces as negatively oriented.

4. An assembly in accordance with claim 3 and wherein further said means comprises fabricating one of said faces to provide a first surface texture, and the other of said faces to provide a second surface texture, each of said textures distinguishable from the other by visual appearance and tactility.

5. An assembly in accordance with claim 3 and wherein further said means comprises fabricating one of said faces to have one color appearance, and the other of said faces to have a color appearance different from the one.

6. An assembly in accordance with claim 3, and wherein further said elements are fabricated to define one of three different tile sizes, and the first face of each of said tile sizes is treated to have a different primary color appearance.

7. An assembly in accordance with claim 1, and wherein further preselected ones of each of said tiles are treated to have a predetermined color and the remainder of each of the tiles are treated to have a different predetermined color.

8. An assembly in accordance with claim 7, and wherein further each of said predetermined colors is a different one of the primary colors.

9. The method of demonstrating the multiplication of first and second algebraic and arithmetic polynomials by the manipulation of a plurality of selectable rectangular elements on a working surface, wherein first ones of said elements are shaped to define squares each having the same edge dimension, second ones of said elements are shaped to define rectangles each having a width dimension equal to the edge dimension of said first elements and a length dimension greater than said width dimension, and third ones of said elements shaped to define squares each having the same edge dimension, last said edge dimension equal to the length of said second elements and incommensurable with respect to the edge dimension of said first elements and the width of dimension of said second elements, comprising the steps of:

placing one array of first and second ones of said elements in alignment on said working surface so that the cumulative length thereof corresponds to said first polynomial;

placing another array of first and second ones of said elements in alignment on said working surface so that the cumulative length thereof corresponds to said second polynomial, the alignment of said first polynomial arranged at right angles to said second polynomial with proximate ends of said arrays substantially forming an apex;

placing first, second, and third ones of said elements on said working surface bounded by the alignment of said arrays so that the area occupied by the rectangle formed by last said step of placing corresponds to the product of said one and another array formed by the first two of said steps of placing.

* * * * *